July 22, 1969
S. JANSON ET AL
3,456,619
EQUIPMENT FOR FACILITATING THE MILKING OF COWS IN COWSHEDS
Filed June 20, 1968
3 Sheets-Sheet 1
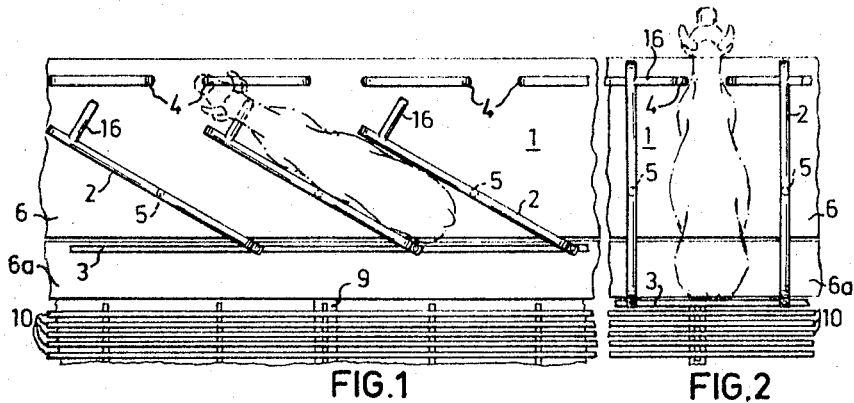
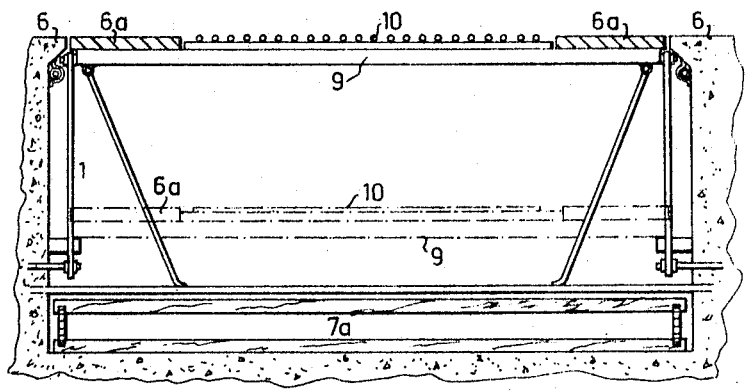
STIG JANSON
ULF STIG JANSON
INVENTORS
BY Young + Thompson
ATTYS.

July 22, 1969
S. JANSON ET AL
3,456,619
EQUIPMENT FOR FACILITATING THE MILKING OF COWS IN COWSHEDS
Filed June 20, 1968
3 Sheets-Sheet 2
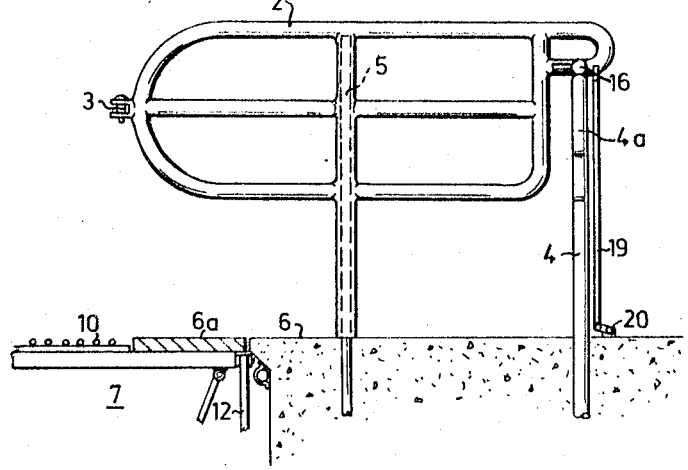
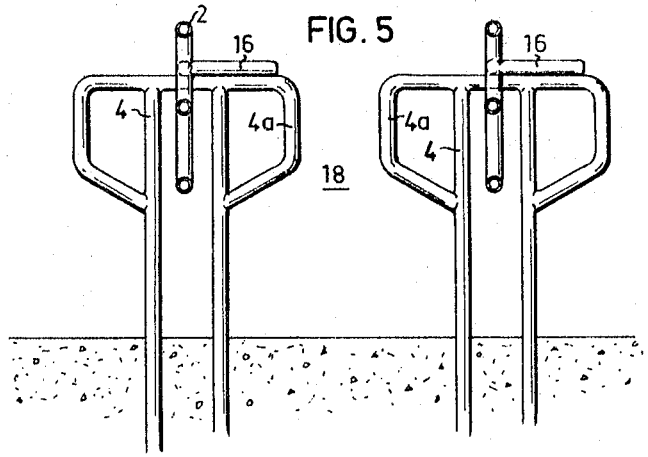
STIG JANSON
ULF STIG JANSON
INVENTORS
BY Young & Thompson
ATTYS.

July 22, 1969     S. JANSON ET AL     3,456,619
EQUIPMENT FOR FACILITATING THE MILKING OF COWS IN COWSHEDS
Filed June 20, 1968     3 Sheets-Sheet 3

STIG JANSON
ULF STIG JANSON
INVENTORS

BY Young & Thompson
ATTYS.

United States Patent Office 3,456,619
Patented July 22, 1969

3,456,619
EQUIPMENT FOR FACILITATING THE MILKING OF COWS IN COWSHEDS
Stig Janson and Ulf Stig Janson, Ryholm, Moholm, Sweden, assignors to Alfa-Laval Aktiebolag, Postfack, Tumba, Sweden
Filed June 20, 1968, Ser. No. 738,651
Claims priority, application Sweden, June 30, 1967, 9,993/67
Int. Cl. A01j 1/00; B61d 3/00
U.S. Cl. 119—27       10 Claims

ABSTRACT OF THE DISCLOSURE

Milking stalls are defined between a plurality of upright horizontally swinging gates whose freely swinging rear ends are pivotally interconnected by a rigid link to collapse in the manner of a parallelogram linkage, thereby simultaneously forcing a cow forward and closely confining the cow during the milking operation. The gates are mounted for horizontal swinging movement about vertical axes disposed intermediate the ends of the gates.

---

The invention is related to a cowshed equipment comprising adjacent stalls or compartments for permanent stay of cows therein, each stall being provided with lateral stall divisions such as cross bars, which can be displaced from a normal position in which they are at right angles to the front limit or front opening of the stall, into a position at another angle to said front limit than a right angle, thereby forcing the cows into an oblique position with respect to the front limit of the stalls so that readily accessible places of work for milking the cows are obtained, and wherein the lateral stall divisions are provided with front limit means engaging the shoulder region of the cow.

By this arrangement also the udders of the cows are readily accessible and the cows are effectively locked in a position for milking.

Additional characteristics of the invention and advantages derived from the same will be seen from the following description of the embodiments shown, by way of example, in the attached drawings.

The following description refers to the attached drawings in which FIG. 1 is a plan view of part of a cowshed equipment in accordance with the invention when the equipment is adjusted for milking the cows. FIG. 2 is a plan view of one of the stalls of the equipment shown in FIG. 1 and being in the normal position. FIG. 3 is a vertical section of a sunk passage extending behind the stall and also serving as a manure gutter or dung groove.

FIG. 4 is a side view, and FIG. 5 is a front view of a stall of the equipment shown in FIGS. 1–3.

Figure 6:
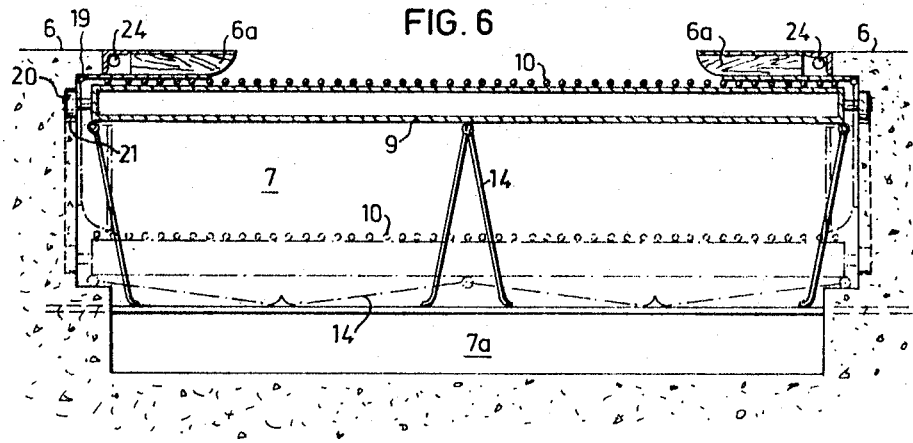
FIG. 6 shows a modification in which part of the floor of the stalls may be let down into the operator's alley.

The equipment shown in FIGS. 1–5 comprises two rows of stalls 1, separated by a passage 7. Each stall 1 is limited by a stall division 2 being similar to a gate, a rear bar 3 and front bars 4 for feeding the cattle. The lateral gates 2 are pivoted to be turned around tubular posts 5 being rigidly mounted in the centre of the stalls.

The lateral gates or stall divisions 2 are provided with transverse front tubes or rods 16 engaging the shoulder of the cow and forming the front limits of the stalls when the stalls are in their oblique condition. Thus, the cows are precisely fixed in the position shown in FIG. 2, and at the same time the hind quarter of the cows is kept away from the rear part 6a of the stall floor or bottom 6 which part rests on a movable frame 9 and may be of wood and projects beyond the edge of the passage 7 extending along the rear ends of the stalls. The frame 9 can be pivotably lowered in the longitudinal direction of the passage.

The frame 9 also carries a grating 10 of round iron rods to pass the manure of the cattle to a manure gutter or groove 7a sunk below the proper passage 7 and serving as a manure gutter. A manure conveyor, an arrangement for washing the groove by watering (sluicing), or similar means, not shown, is provided for the manure gutter 7a.

The frame 9 is supported by pivotable arms 12 having pivots at the wall of the passage or manure gutter and may be lowered to a position in which the frame is supported by abutments such as steps or ledges or similar means projecting from said wall. Alternatively, the frame may be lowered by linear vertical displacement, by some kind of hydraulic jack or the like.

Sheet metal splash boards 14 may be pivotably journalled at the lower side of the frame to prevent splashing of the walls of the gutter by manure. When the frame 9 is lowered, the splash boards will automatically slide and angularly move towards the grating 10 to cover the proper manure gutter 7a and to shield off the odour arising from the gutter.

As may be seen from FIGS. 4 and 5, the feed gates 4 at the front of the stalls and the transverse tubes or pins 16 engaging the shoulder of the cow co-operate in the normal right-angled position of the stall. The gates 4 include socket tubes fixed into the floor of the stall and having upper, grip-like parts 4a engaging the shoulders of the cows from two sides to prevent the cows from entering the feeding table. The gates are formed such that an opening 18 for the throat of the cow remains between two adjacent gate parts 4a.

As may be seen from FIG. 5, the transverse rods 16 are provided at a level above the floor 6 of the stall such as to be immediately adjacent to, or contacting the upper tubes of the feed gates 4 without extending into the associated opening 18.

FIG. 4 shows by way of example locking means 19, 20 to block the lateral gates 2 in a desired fixed angular position.

The lateral gates 2 may be journalled at their axes, viz. on the tubular posts 5 in a way (not shown in FIG. 4) such as to be displaced towards the rear end of the posts into another position in which a swinging movement of the gate is possible, and an emergency exit for the cows may be obtained thereby.

If the cows are to be moved into a position for milking, the stall is angularly displaced or deformed by common operation of the rear bars 3. If desired, the rear bar 3 of each individual stall can be separately removed.

FIG. 6 shows part of an equipment wherein the movable part 6a of the floor of the stalls can be rocked around a pivot 19 provided below the fixed floor 6 of the stalls. When covering the passage, the pivotable floor parts 6a are resting on a grating 10 supported by a frame 9 and arranged in the passage in the same way as in the embodiment described above. The ends of the frame 9 carry rollers 20 rolling on inclined guides 21 which are arranged at the side walls of the passage and may consist of recesses therein. When the passage is to be uncovered, the frame 9 is pushed in the longitudinal direction of the passage to the lower position indicated by dashed lines in FIG. 6. This movement may be caused or facilitated by gravity and may be braked, for example by a driving device (not shown) such as an electrical motor operating the frame through a wire, which may be used also for pulling the frame into the upper position where the frame covers the passage. When the frame is lowered, the floor parts 6a are pivoted around their shafts 19 into the position shown in dashed lines so that a greater portion of the passage may be uncovered than in the embodiment described first. When the cows occupy their oblique position, any manure from them will pass through the grating 10 and is collected in the lower manure gutter below the passage such that the floor parts 6a will not be soiled.

As in the first-mentioned embodiment, a number of sheet metal splash boards 14 are angularly movable around journals at the lower side of the frame 9.

A tube or hose line 24 connected to the milking machine (not shown) is provided at the upper part of the passage so as to be protected by the movable floor parts 6a in the upper position of these parts but becomes accessible when the parts 6a are let down into the passage.

What we claim is:

1. Arrangement to facilitate the confinement of a cow for milking operations, comprising a plurality of gates defining between them at least one stall for a cow, means pivotally supporting the gates for horizontal swinging movement of the gates about upright axes disposed intermediate the length of the gates, means for closing the forward ends of the gates, and means pivotally interconnecting the rear ends of the gates to maintain the gates spaced apart and parallel to each other during said horizontal swinging movement, so that when the gates are swung in such a direction that they approach each other, a cow between the gates will be forced into a position at an angle to its original position and be moved forward into milking position and be more closely confined between the gates.

2. Arrangement as claimed in claim 1, and means defining a sunken passage that extends between the front and rear limit of the stalls when said gates are at their maximum spacing from each other, and a cover movably covering said sunken passage.

3. Arrangement as claimed in claim 2, and means mounting said cover for movement from a raised position in which said cover forms a portion of the floor of the stall and a lower position in which said cover is sunk in said passage.

4. Arrangement as claimed in claim 3, said cover mounting means comprising a frame which carries a grating covering said passage and which supports said grating for movement into a lower position which is still spaced from the bottom of said passage.

5. Arrangement as claimed in claim 4, and means mounting said frame for vertical swinging movement between said upper and lower positions about an axis transverse to the longitudinal direction of the passage.

6. Arrangement as claimed in claim 4, said frame having rollers thereon that ride on inclined guides on the side walls of said passage so that the frame can be moved in the direction of the passage into a lower position vertically spaced from the bottom of the passage.

7. Arrangement as claimed in claim 4, and a splash board movably mounted on the frame to protect the sides of the passage when the frame occupies its upper position, said splash board being swingable to a position covering the bottom of the passage when the frame is moved into its lower position.

8. Arrangement as claimed in claim 1, and front limit means mounted on said gates for adjustive movement lengthwise of said gates.

9. Arrangement as claimed in claim 1, and means mounting said gates for rearward displacement relative to their axes into another position of bearing to provide in the front part of the stalls an emergency exit for the cows.

10. Arrangement as claimed in claim 1, and means for locking said gates in a horizontally swung position.

References Cited
UNITED STATES PATENTS

| | | | |
|---|---|---|---|
| 371,928 | 10/1887 | Davis | 119—11 |
| 1,910,666 | 5/1933 | Babson | 119—15 |
| 3,016,043 | 1/1962 | Dunn | 119—27 |
| 3,024,766 | 3/1962 | Eveland | 119—96 |
| 3,106,188 | 10/1963 | McMurray | 119—15 X |

ALDRICH F. MEDBERY, Primary Examiner

U.S. Cl. X.R.

119—11